S. J. LAVENDER.
FUEL ECONOMIZER FOR INTERNAL COMBUSTION ENGINES.
APPLICATION FILED SEPT. 7, 1918.

1,313,096.

Patented Aug. 12, 1919.
2 SHEETS—SHEET 1.

Witnesses
George Kuttner,
P. M. Smith.

Inventor
S. J. Lavender
By Victor J. Evans.
Attorney

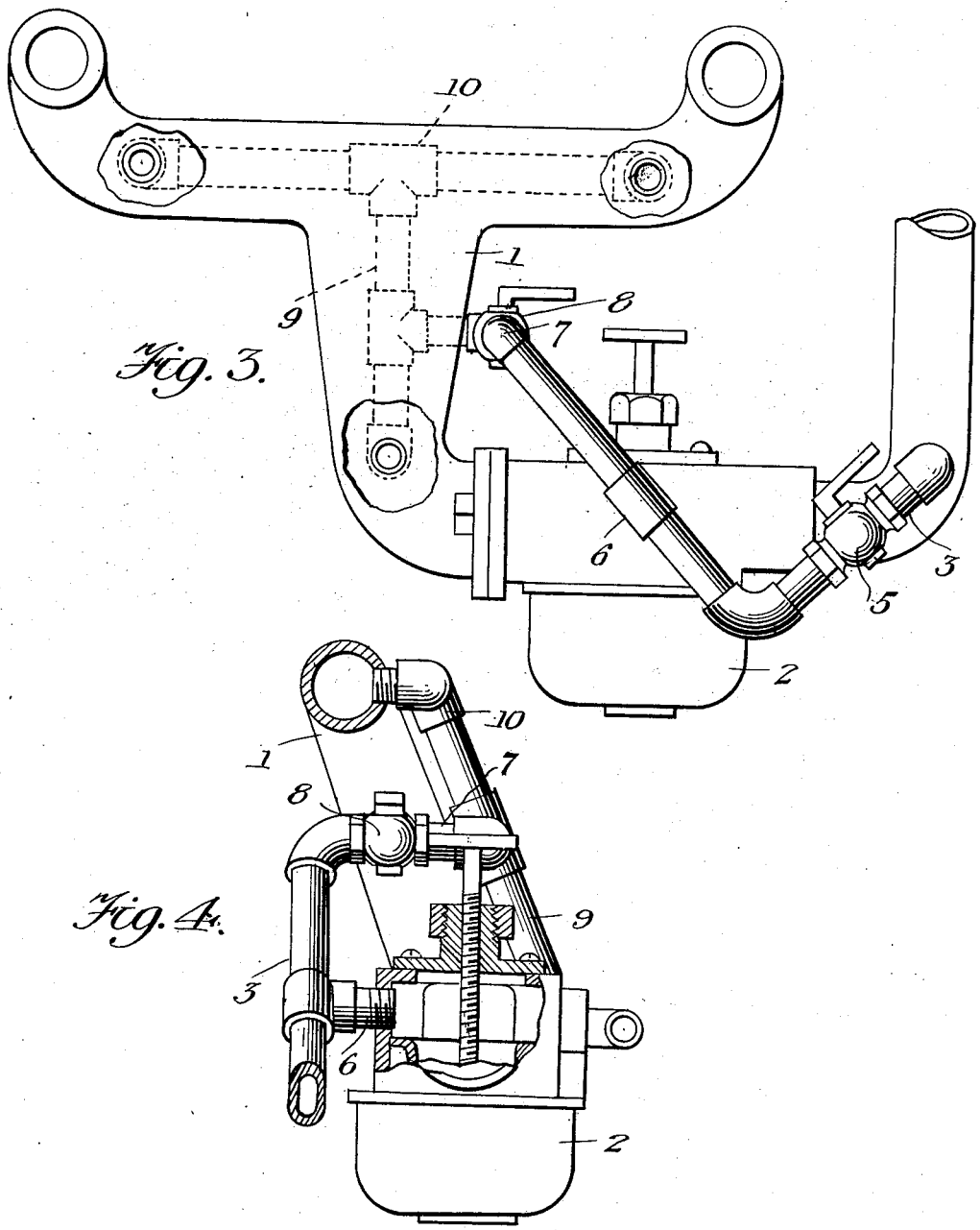

UNITED STATES PATENT OFFICE.

STEPHEN JUSTICE LAVENDER, OF BARNESVILLE, GEORGIA.

FUEL-ECONOMIZER FOR INTERNAL-COMBUSTION ENGINES.

1,313,096. Specification of Letters Patent. Patented Aug. 12, 1919.

Application filed September 7, 1918. Serial No. 253,059.

*To all whom it may concern:*

Be it known that I, STEPHEN J. LAVENDER, a citizen of the United States, residing at Barnesville, in the county of Pike and State of Georgia, have invented new and useful Improvements in Fuel-Economizers for Internal-Combustion Engines, of which the following is a specification.

This invention relates to fuel economizers for internal combustion engines, the object in view being to provide means of the character referred to readily applicable to any standard carbureter and intake manifold, whereby the fuel and mixture are effectively vaporized by heating and thorough agitation and additional mixing at a plurality of locations during the movement of the mixture from the carbureter to the engine, the result being better combustion and a consequent economy of fuel, increased working efficiency in the engine, and also a reduction in the deposit of carbon within the combustion space or spaces of the engine.

With the above and other objects in view, the invention consists in the construction, combination and arrangement of parts as herein described, illustrated and claimed.

In the accompanying drawings:

Fig. 3 is a horizontal section taken above the carbureter and the transverse run of the hot air pipe.

Fig. 4 is a vertical cross section through the upper portion of the carbureter in line with the hot air pipe or suction connection.

Figure 1:
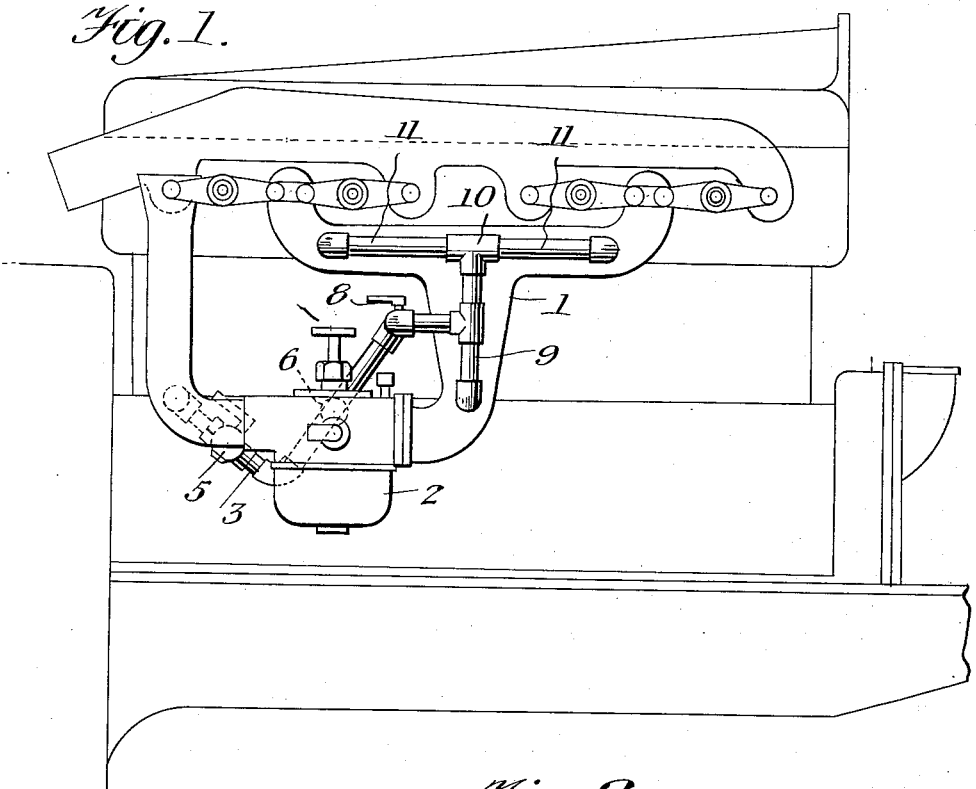
Figure 1 is a side elevation showing the invention in its applied relation to the carbureter and intake manifold of an internal combustion engine, the latter being conventionally shown.
Figure 2:
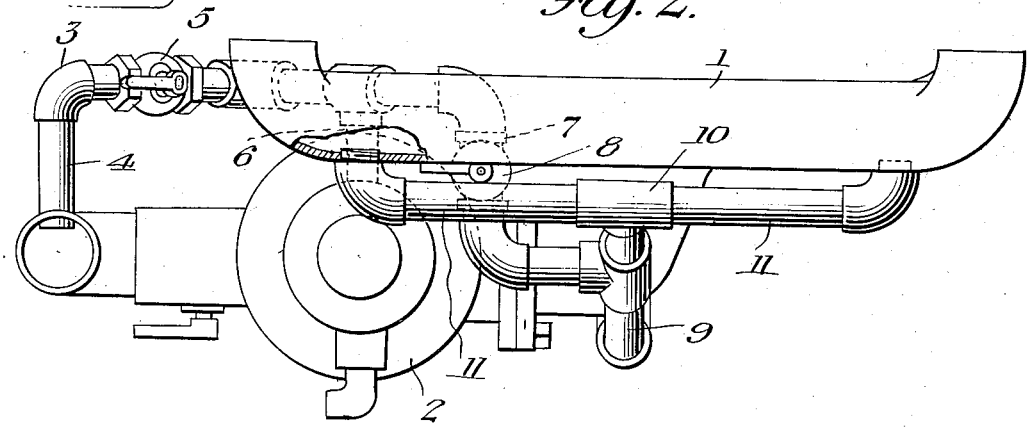
Fig. 2 is a plan view of the same.

Referring to the drawings, 1 designates the intake manifold of an internal combustion engine and 2 the carbureter of the engine, said parts being combined with each other and associated with the engine in the usual manner.

In carrying out the present invention, I provide a hot air suction pipe which comprises an initial or hot air receiving section 3, the same communicating by means of a nipple 4 with the main hot air pipe which furnishes hot air to the carbureter. The initial section of the hot air suction pipe has incorporated therein a stop cock 5 which may be used as a choke valve when starting an engine and in order to provide a rich mixture for such purpose. When the economizer is in use, the stop cock 5 is opened. The hot air suction pipe is connected directly with the interior of the carbureter by means of a suction branch 6, the latter communicating with the interior of the carbureter just above the fuel spray nozzle, so that a portion of the fuel is drawn by suction into said hot air suction pipe. Beyond the connection 6, the suction pipe has a portion 7 extending transversely across and over the carbureter, said transverse portion having a manually controlled stop cock or valve 8 incorporated therein, which stop cock or valve may be operated by a dash controlled or connected with the throttle control for simultaneous operation with the latter. The transverse portion of the hot air suction pipe extends to a point in close proximity to the upright portion of the intake manifold where it is connected by a T-fitting to an upright or substantially vertical section 9 of the suction pipe, the lower branch of the pipe 9 communicating with the lower portion of the intake manifold and the upper branch thereof being connected by a T-fitting 10 to two other horizontally and oppositely extending branches 11 which communicate with the branches of the intake manifold as close as practicable to the points of communication between said intake manifold and the combustion chambers of the cylinders of the engine.

From the foregoing description taken in connection with the accompanying drawings, it will now be seen that by reason of the action of the engine, during the operation of the pistons, suction is created in the hot air suction pipe and hot air is drawn through said pipe. In such movement of the hot air, suction is created in the connection between said hot air pipe and the carbureter, so that some fuel is drawn from a point directly above the point of the spray nozzle of the carbureter into said hot air suction pipe. The fuel thus drawn in is mixed with the hot air and the temperature thereof raised; then the mixture is divided by the branches of the suction pipe and is drawn into the intake manifold at three different points, one point near the bottom of the intake manifold and two other points adjacent to the outer ends of the horizontal branches of said manifold. The result is a more thorough vaporization of the fuel, a better and more highly combustible mixture, economy of fuel, increased power in the engine, and a reduction in the accumulation of carbon deposits in the combustion space or spaces of the engine.

I claim:—

1. The combination with the intake manifold, carbureter and carbureter hot air supply connection of an internal combustion engine, of a hot air suction and distributing pipe having its receiving end connected to said hot air supply connection and having its other end in communication with the intake manifold, said suction pipe having a suction nozzle which communicates with the carbureter in close proximity to the fuel nozzle thereof whereby a portion of the fuel is drawn into said suction pipe, heated and distributed to the manifold.

2. The combination with the intake manifold, carbureter and carbureter hot air supply connection of an internal combustion engine, of a hot air suction and distributing pipe having its receiving end connected to said hot air supply connection and having its other end branched to enter the intake manifold at a plurality of widely spaced points, said suction pipe also having a suction nozzle which communicates with the carbureter in close proximity to the fuel nozzle thereof, whereby a portion of the fuel is drawn into said suction pipe, heated and distributed in the manifold.

In testimony whereof I affix my signature.

STEPHEN JUSTICE LAVENDER.